United States Patent [19]

Higgins

[11] Patent Number: 5,811,757
[45] Date of Patent: Sep. 22, 1998

[54] POWER SOURCE INCLUDING PARALLEL SWITCHING CIRCUITS AND RELATED METHODS FOR A WELDING OR CUTTING SYSTEM

[75] Inventor: Philip K. Higgins, Society Hill, S.C.

[73] Assignee: The ESAB Group, Inc., Florence, S.C.

[21] Appl. No.: 608,748

[22] Filed: Feb. 29, 1996

[51] Int. Cl.⁶ .................................................. B23K 9/10
[52] U.S. Cl. ............................ 219/137 PS; 219/130.32; 363/40
[58] Field of Search .................. 219/137 PS, 130.32, 219/130.33, 130.5, 130.51; 363/40, 43, 70

[56] References Cited

U.S. PATENT DOCUMENTS

| | | | |
|---|---|---|---|
| 3,619,758 | 11/1971 | Deranian | 363/70 |
| 4,417,130 | 11/1983 | Banba et al. | 219/130.51 |
| 4,425,493 | 1/1984 | Mizuno et al. | 219/137 PS |
| 4,438,317 | 3/1984 | Ueguri et al. | 219/130.51 |
| 4,803,610 | 2/1989 | Gulczynski | 363/70 |

FOREIGN PATENT DOCUMENTS

| | | | |
|---|---|---|---|
| 53-113739 | 10/1978 | Japan | 219/130.32 |
| 57-19171 | 2/1982 | Japan | 219/130.32 |
| 57-19172 | 2/1982 | Japan | 219/130.32 |

OTHER PUBLICATIONS

*Instructions for SVI–400 Welding Power Supply,* Linde Union Carbide, L11–910–F, Jul., 1982, pp. 1–16.

Catalog, *Acme Transformer,* Acme Transformer, Division of Acme Electric Corporation, 1987.

*L–TEC Parts List,* Plasma Arc Welding and Cutting Products, Sheet PR 175, 10–A, p. 3, Jul. 15, 1987.

*Electrical Connection Diagrams,* Acme Transformer, Division of Acme Electric Corporation, B–111704–B.

*Buck and Boost Transformer Installation Instructions,* Acme Transformer, Division of Acme Electric Corporation, A–22497–F.

*Electrical Connection Diagrams,* Acme Transformer, Division of Acme Electric Corporation, B–111703–B.

*Buck and Boost Transformer Installation Instructions,* Acme Transformer, Division of Acme Electric Corporation, A–36715–E.

*Instructions for PCM–82i & 84i Plasma Arc Cutting Packages,* L–TEC Welding & Cutting Systems, F–14–375–A, Feb., 1989, pp. 1–16.

*Instructions for Digipulse 450 Pulsed MIG Welding System,* L–TEC Welding & Cutting Systems, F–14–350, Jul., 1986, pp. 1–28.

*Instructions for Linde Trimpower 300 SVI,* P/N 679370, L–TEC Welding & Cutting Systems, WCSF–14–249, Sep., 1985, pp. 1–16.

*SVI 300i cvcc Power Source Instruction Manual,* ESAB Welding & Cutting Products, F–15–183, Nov., 1994, pp. 1–32.

*Instruction Manual SVI 450i cvcc Power Source,* ESAB Welding & Cutting Products, F–15–071–B, Jun., 1995, pp. 1–34.

*Instruction Manual Digipulse 450i Power Source,* ESAB Welding & Cutting Products, F–14–014–B, Apr., 1995, pp. 1–32.

(List continued on next page.)

*Primary Examiner*—Clifford C. Shaw
*Attorney, Agent, or Firm*—Bell Seltzer Intellectual Property Group of Alston & Bird LLP

[57] ABSTRACT

A power source for a plasma cutting tool includes first and second power switching circuits and a controller. Each power switching circuit includes a switch for switching electrical power to a respective output, and the outputs of the power switching circuits are connected in parallel. The controller controls the switches in response to a desired output for the power source. The controller also includes a synchronizer for synchronizing the first and second switches so that both of the switches switch electrical power at a common duty cycle. The synchronizer can also maintain a 180 degree phase relationship between switching of the first and second switches. Related methods are also discussed.

34 Claims, 5 Drawing Sheets

OTHER PUBLICATIONS

*ESP Ultra–Life 300 Cutting Power Source Maintenance Manual,* P/N 33520, F–15–141A, May, 1994.

*Section 4 Troubleshooting,* ESP Ultra–Life 300 Power Source, The ESAB Group, Inc., F–15–141A, Apr., 1994, pp. 29–41.

*Hypertherm,* Instruction Manual IM–41 H H–401 and H–601 Power Supply, Hypertherm, Incorporated, Oct., 1980, pp. 1–27.

*ESP–400 Cutting Power Source Maintenance Manual,* P/N 33518, F–15–108, Jul., pp. 1–27.

*ESP–600 Cutting Power Source Maintenance Manual,* F–15–109, Jun., 1993, pp. 1–26.

*ESP Ultra–Life 300 Cutting Power Source Maintenance Manual,* P/N 33520, ESAB Welding & Cutting Products, F–15–141A, Mar., 1996.

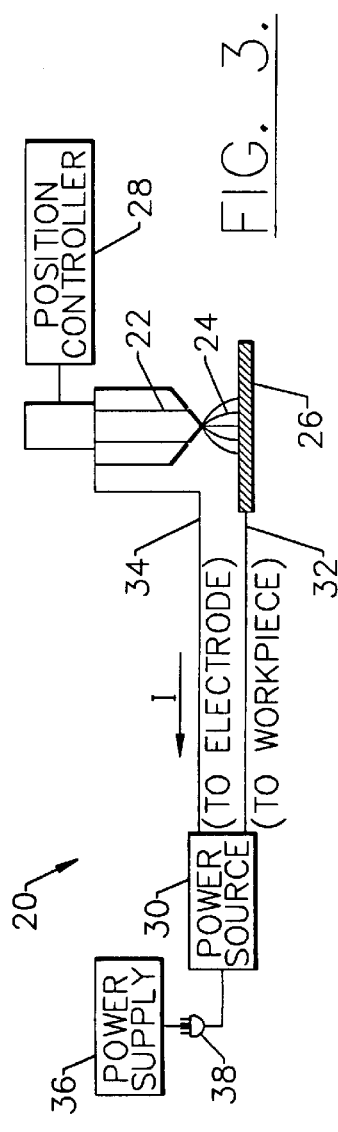
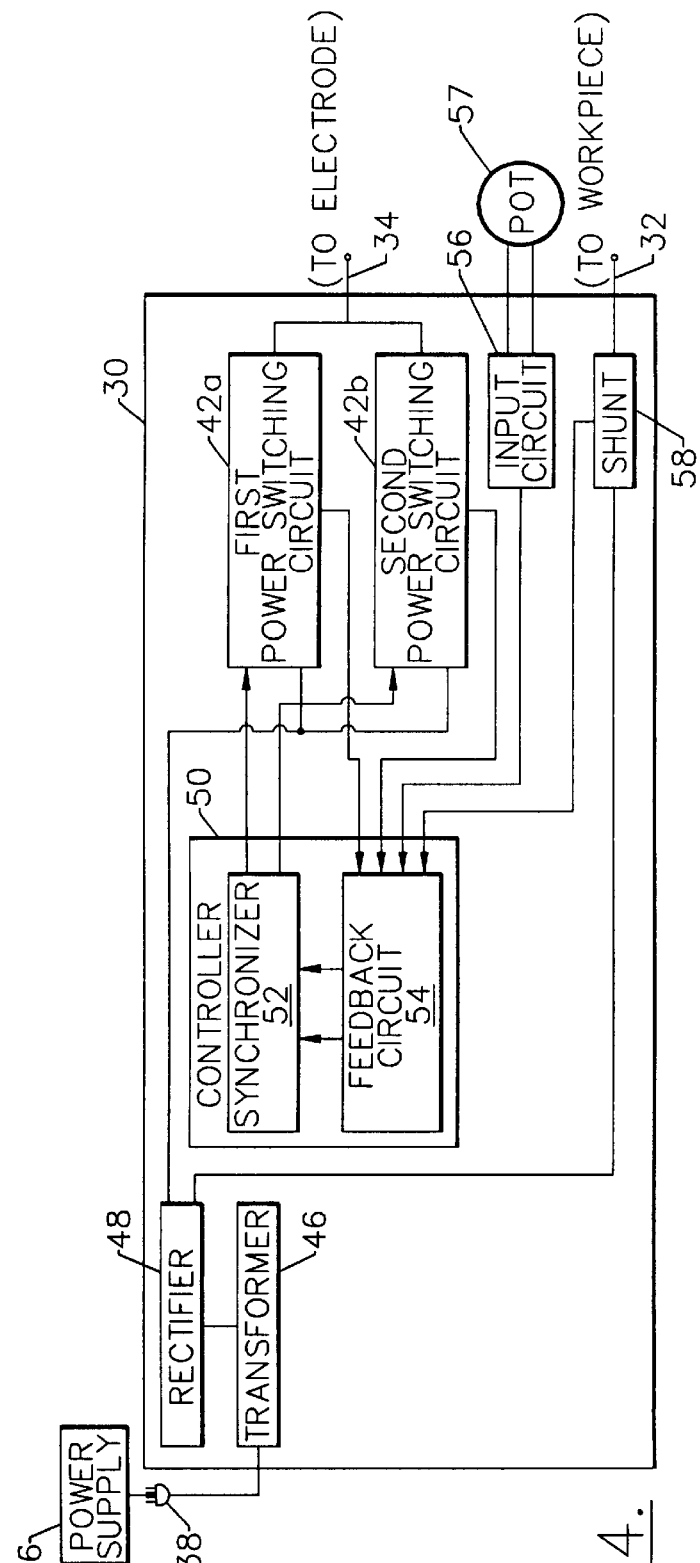
FIG. 3.
FIG. 4.

POWER SOURCE INCLUDING PARALLEL SWITCHING CIRCUITS AND RELATED METHODS FOR A WELDING OR CUTTING SYSTEM

FIELD OF THE INVENTION

The present invention relates to the field of power sources, and more particularly to the field of power sources for electric arc welding and cutting systems.

BACKGROUND OF THE INVENTION

Many welding and cutting systems use an electric arc to generate heat. For example, a plasma cutting system uses an electric arc to cut a metal with a high degree of precision. Generally, a cathode of an electric arc tool is positioned over the metal workpiece to be cut, and an electric potential is generated between the two. When the potential between the cathode and the workpiece reaches a critical level, an electric arc is generated.

One problem with plasma cutting tools of the prior art is that the cathode may erode excessively with use. Accordingly, the length of life of the cathode must be balanced against degradation in the performance of the plasma cutting tool. Stated in other words, the cathode may be used for longer periods of time thus saving replacement costs if degradation in performance can be tolerated. Alternately, higher performance can be achieved by replacing the cathode more frequently if the higher replacement costs can be tolerated.

Furthermore, it has been found that the life of the cathode is a function of the AC ripple present in the electric power used to generate the arc between the cathode and the workpiece. As shown in FIGS. 1 and 2, the cathode life has been found to be a function of both the ripple frequency and the ripple amplitude.

In particular, FIG. 1 shows that the erosion (kilogram/coulomb along the vertical axis) of a tungsten cathode decreases as a function of increasing ripple frequency (Hz along the horizontal axis). FIG. 2 shows that erosion (kilogram/coulomb along the vertical axis) increases as a function of increasing ripple amplitude, where the percentage of ripple amplitude is determined by dividing the ripple amplitude ($\Delta I$) by the average current (Avg. I) ([$\Delta I$]/[Average I]×100% along the horizontal axis). Line 1 (unfilled circles) in each graph represents the performance of a tungsten cathode with a 3 mm diameter and a 4 mm length, and line 2 (filled circles) in each graph represents the performance of a tungsten cathode with a 4 mm diameter and a 4.5 mm length.

A conventional power source for a plasma cutting tool controls the electric power delivered to the cathode by switching a high voltage DC source. The length of the duty cycle of this switching determines the average DC power delivered to the cathode. The switching, however, also produces an AC ripple portion of this output power. As discussed above, this AC ripple contributes to the degradation of the cathode.

SUMMARY OF THE INVENTION

It is therefor an object of the present invention to provide a power source for a welding or cutting system having increased performance capabilities.

It is another object of the present invention to provide a power source for a welding or cutting system which increases the operational life of the electrode of the system.

It is still another object of the present invention to provide a power source having a reduced ripple portion of the electrical power generated thereby.

These and other objects are provided according to the present invention by a power source including first and second electrical power generating means, combining means, and control means. The first and second electrical power generating means each generate respective first and second electrical output power signals, and the combining means combines the electrical output power signals. The control means controls the first and second power generating means in response to a desired power output for the power source so that a ripple portion of the combined power output signal has an RMS ripple component less than 5 percent of the average combined power output. Accordingly, this power source can provide increased performance for the electric arc welding or cutting system as well as increased operational lifetime for the electrodes used with the system.

In particular, the power source can include first and second power switching circuits, the outputs of which are connected in parallel. Each power switching circuit includes a switch for switching electrical power, and a controller controls the switches responsive to a desired power output. The controller also includes a synchronizer for synchronizing the first and second switches so that both switch electrical power at a common duty cycle. Accordingly, each of the power switching circuits switches an equal portion of the power provided to the electric arc tool. In addition, a ripple portion of the power switched by each of the power switching circuits may tend to cancel the ripple portion of the power switched by the other.

Furthermore, the synchronizer preferably maintains a 180 degree phase relationship between switching of the first and second switches. Accordingly, the ripple portion of the electrical power switched by each switching circuit will be the same. Because of the 180 degree phase relationship between the switching of the circuits, however, the ripple portions of the power switched by each circuit will also be 180 degrees out of phase. Accordingly, when combined, the ripple portions will most effectively cancel one another. Furthermore, any remaining ripple portion will have a frequency equal to twice the ripple portion generated by a single power switching circuit.

By reducing the ripple portion of the combined power output for the power source and doubling the frequency of any remaining ripple portion, the operational life of the electrode of the electric arc tool can be increased. Furthermore, the performance of the electric arc tool can also be increased.

BRIEF DESCRIPTION OF THE DRAWINGS

FIG. 3 is a block diagram of a plasma cutting system according to the present invention.

FIG. 4 is a block diagram of the power source of FIG. 3.

DETAILED DESCRIPTION

Figure 1:
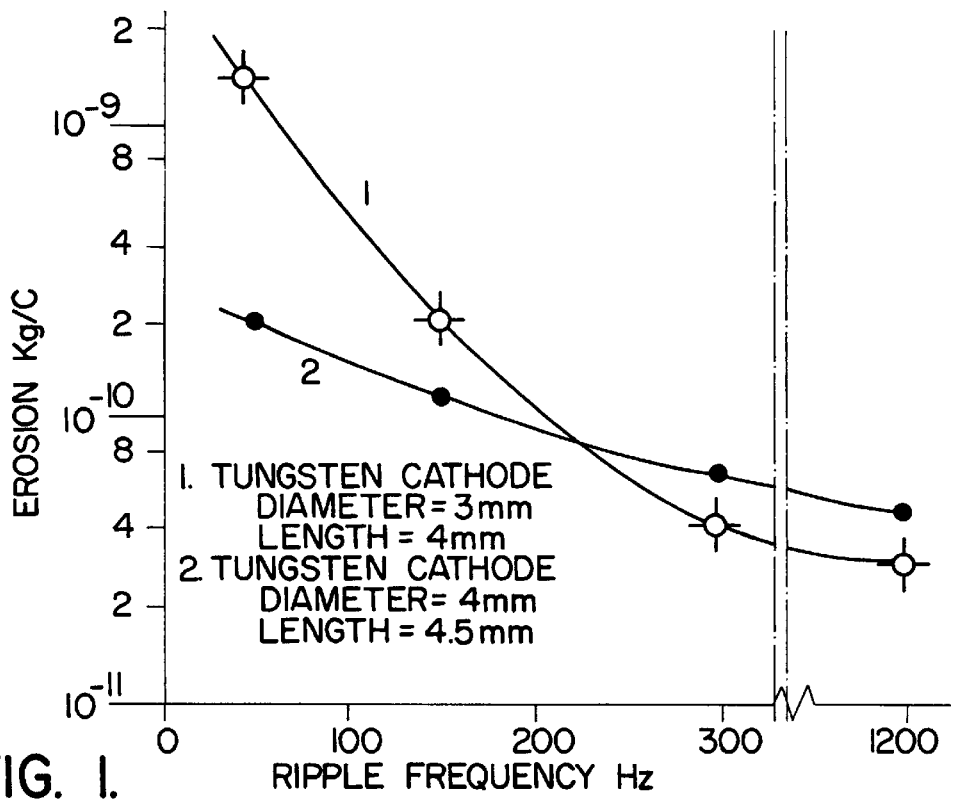
FIG. 1 is a graph illustrating the erosion of tungsten cathodes of a plasma cutting tool as a function of the ripple frequency according to the prior art.
Figure 2:
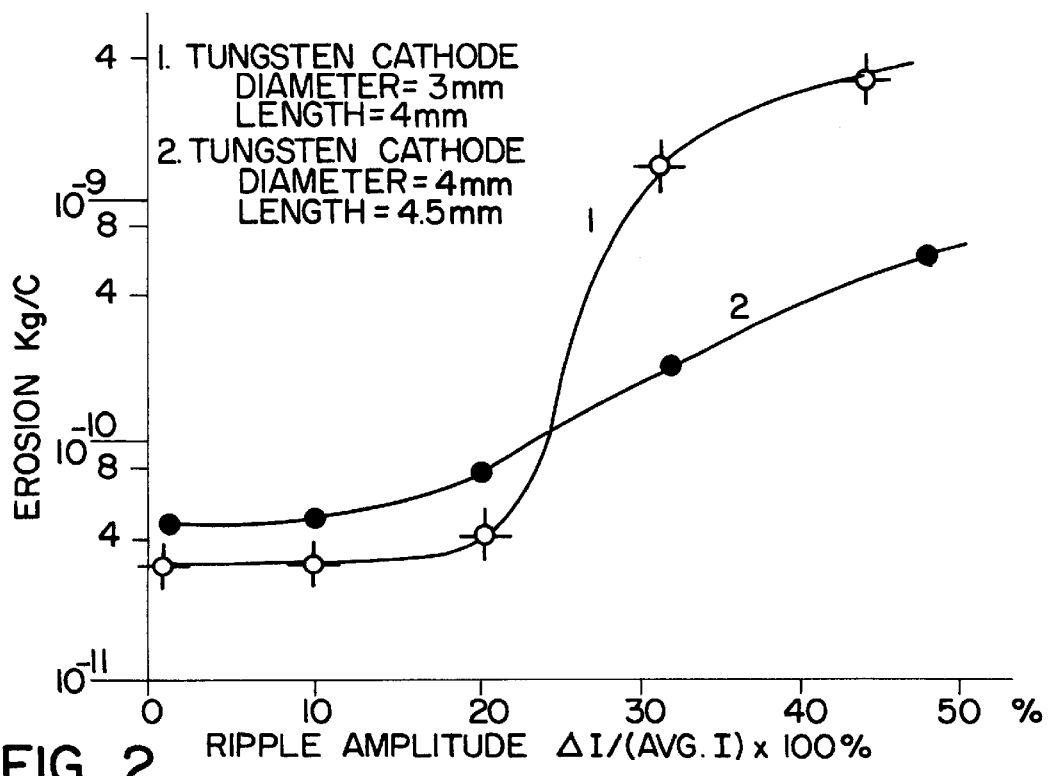
FIG. 2 is a graph illustrating the erosion of tungsten cathodes of a plasma cutting tool as a function of the ripple amplitude according to the prior art.

The present invention now will be described more fully hereinafter with reference to the accompanying drawings in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

In an arc welding or cutting system, according to the present invention, an electrode 22 of an electric arc tool is used to generate an electric arc 24 between itself and the workpiece 26, as best shown in FIG. 3. In the illustrated plasma cutting system 20, the electric arc 24 delivers sufficient energy to the workpiece 26 that the workpiece is cut. By moving the electrode 22 relative to the workpiece 26 using the position controller 28, the workpiece 26 can be cut to a predetermined shape.

The power source 30 provides the electrical power used to generate the electric arc 24 between the electrode 22 and the workpiece 26. As shown, the power source 30 can generate a relatively high voltage at the first output 32 which is connected to the workpiece 26, and the power source can generate a relatively low voltage at the second output 34 which is connected to the electrode 22. For purposes of discussion, the workpiece can be considered to be grounded so that a negative potential is generated at power source output 34. Accordingly, current flows from the power source 30 to the workpiece 26, across the electric arc 24, to the electrode 22 and back to the power source 30.

Electrical power is in turn provided to the power source 30 by an external power supply 36 such as a conventional 460 volt three-phase power supply from a utility company. The power source 30 and power supply 36 can be connected by any conventional power connection 38 known to those having skill in the art. For example, the power connection 38 can be a removable plug or a hard wired connection.

The major components of the power source 30 are illustrated in FIG. 4. As shown, electrical power from the power supply 36 is coupled through the power connection 38 to the transformer 46. The transformed electrical power is rectified by the rectifier 48 and provided to the power switching circuits. In particular, the power source 30 includes first and second power switching circuits 42a and 42b with respective outputs being connected in parallel to the second output 34 which goes to the electrode. The rectified electrical power is switched by the parallel power switching circuits 42a and 42b to provide electrical power for the electric arc.

Each of the switching circuits 42a and 42b is controlled by the controller 50 which includes a synchronizer 52 and a feedback circuit 54. The synchronizer 52 synchronizes the first and second switching circuits so that each switches electrical power at a common duty cycle with a 180 degree phase relationship between the two. The feedback circuit 54 determines the duty cycle for the power switching circuits in response to the user input (including potentiometer 57 and input circuit 56), the shunt 58, and feedback signals from each of the power switching circuits 42a and 42b so that a desired electrical power from the power source 30 is maintained.

Figure 5:
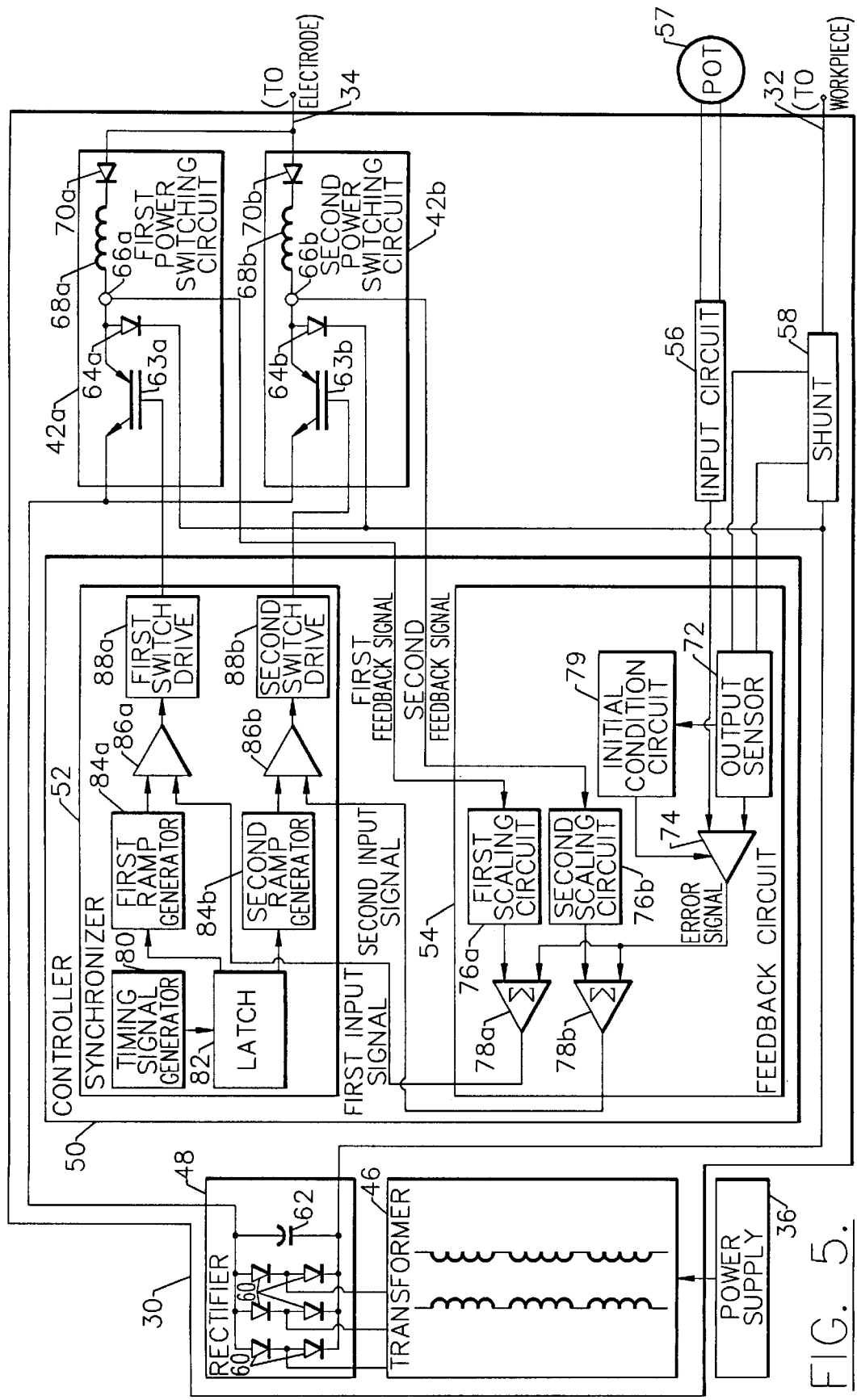
FIG. 5 is a circuit diagram of the power source of FIG. 4.

Important aspects of the circuitry of the power source 30 are shown in FIG. 5. As discussed, electrical power is provided to the power source 30 by an external power supply 36 such as a 460 volt three-phase power supply. This electrical power is transformed to a desired level by a transformer 46 such as a three-phase transformer. The transformed electrical power is then rectified to DC electrical power by a rectifier 48 such as a three-phase rectifier. As will be understood by those having skill in the art, the three-phase power can be rectified by a plurality of rectifying diodes 60 together with a capacitor 62. Accordingly, the rectifier generates DC electrical power having a relatively constant voltage.

As shown, the first output from the rectifier is provided (through shunt 58) to first output 32 which can be connected to the workpiece to be cut. The second output of the rectifier is provided to the first and second power switching circuits 42a and 42b. All electrical power must pass through one of the two power switching circuits in order to reach the electrical arc.

Each of the power switching circuits can include a switch 63, a free wheeling diode 64, a current sensor 66, an inductor 68, and a blocking diode 70. The switch 63 can be an Insulated Gate Bipolar Transistor (IGBT) which can turn both on and off in response to a switch drive signal provided by the controller 50, and the current sensor 66 is preferably a Hall Sensor which is used to provide a feedback signal to the controller 50. The free wheeling diode 64 provides an electrical path to the workpiece so that energy stored in the inductor 68 can be dissipated when the switch 63 is turned off. The blocking diode 70 in each power switching circuit can help isolate each switching circuit.

In addition, the switch 63 for each power switching circuit 42 may include multiple insulated gate bipolar transistors in parallel. This arrangement may increase the life of the switching circuit by reducing the power switched to each IGBT.

The controller 50 generates the switch drive signals which control the switching of the switches 63a and 63b in respective power switching circuits 42a and 42b. The controller 50 includes a feedback circuit 54 and a synchronizer 52. The feedback circuit 54 generates first and second input signals, and the synchronizer 52 generates synchronized switch drive signals for the power switching circuits responsive to the first and second input signals generated by the feedback circuit 54.

In particular, the feedback circuit 54 receives first and second feedback signals from first and second current sensors 66a and 66b, and these signals are representative of the current through respective power switching circuits 42a and 42b. The feedback circuit 54 also receives signals from a user input and shunt 58. The user input can be a potentiometer 57 and an input circuit 56 which together generate a DC signal (between 0 and 10 volts) representative of a desired output for the power source 30. Alternately, the user input can be any source of a signal representative of the desired output. For example, the user input can be provided by an external source such as an automatic control system. The shunt is preferably a low-resistance high-precision resistor and the voltage drop across this resistor can be used to represent the total current generated by the power source 30.

During normal operations, the outputs from the shunt 58 are applied to the output sensor 72 which converts the voltage differential across the shunt into an actual output signal which represents the combined current switched by both of the power switching circuits. This actual output signal is also scaled so that it covers the same range as the desired output signal generated by the input circuit 56. The actual output signal and the desired output signal are both applied to the operational amplifier 74 to produce an error signal representative of the difference between the actual and desired power source output.

The current sensors 66a and 66b from each of the power switching circuits generate respective first and second feedback signals which are provided to the feedback circuit 54. Each feedback signal is scaled by a respective scaling circuit 76a and 76b, and summed with the error signal by a respective summing circuit 78a and 78b. As shown, the first summing circuit 78a generates a first input signal which is representative of electrical current to be switched by the first power switching circuit 42a. The second summing circuit 78b generates a second input signal which is representative of the electrical current to be switched by the second power switching circuit 42b. The first and second input signals are provided to the synchronizer 52 where the switch drive signals are generated.

The feedback circuit 54 also includes an initial condition circuit 79 which suppresses operation of the operational amplifier 74 until switching starts. The initial condition circuit 79 determines whether switching has begun by monitoring an output from the output sensor 72. As long as there is no current through the shunt 58, the initial condition circuit 79 suppresses the operational amplifier 74 so that the error signal indicates no error. Once current is detected by the output sensor 72 indicating that switching has begun, the operational amplifier 74 is enabled allowing operation of the outer feedback loop. The initial condition circuit 79 prevents the operational amplifier 74 from generating a maximum error signal (resulting from the gain of the operational amplifier 74) when the power source is first turned on. Accordingly, overshooting of the desired output can be reduced. In particular, an optically activated field effect transistor in the initial condition circuit 79 can be used to suppress operation of the operational amplifier 74.

Figure 6:
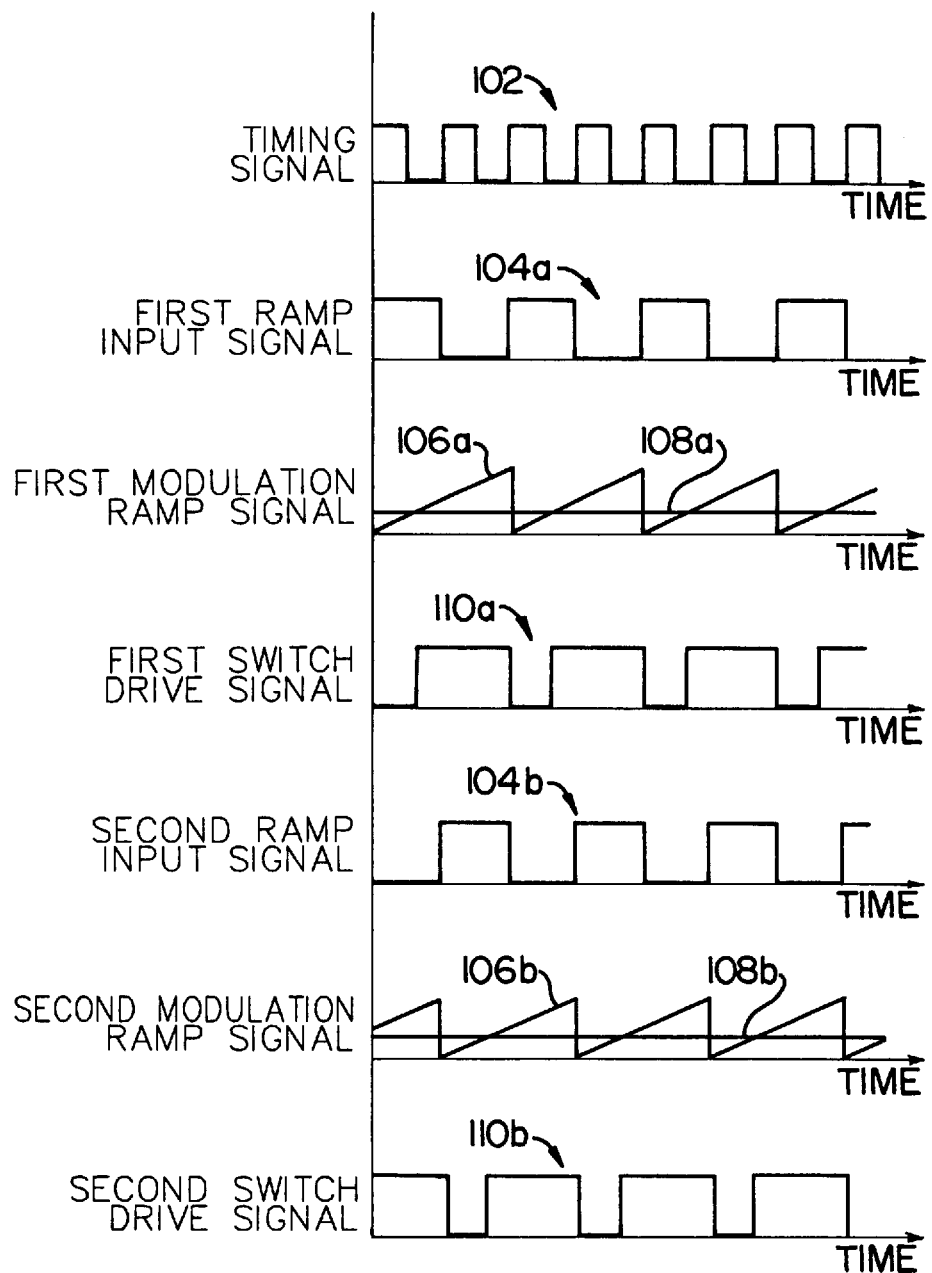
FIG. 6 is a timing diagram illustrating the timing of signals within the synchronizer of FIG. 5.

The operation of the synchronizer 52 will now be discussed with reference to FIG. 5 as well as the timing diagrams of FIG. 6. The timing signal generator 80 generates a timing signal 102 and can be a conventional 20 kHz oscillator. The timing signal is provided to the latch 82 which can be a D-type flip-flop. In response, the latch 82 generates a first ramp input signal 104a and a second ramp input signal 104b. The ramp input signals each have a frequency equal to one half the frequency of the timing signal 102, and the two ramp input signals are 180 degrees out of phase. Each ramp input signal is provided to a respective ramp generator 84a and 84b. Each ramp generator generates a respective modulation ramp signal 106a and 106b which is a sawtooth waveform having a frequency equal to that of the ramp input signals. Because the ramp signals reset on the rising edge of the respective ramp input signal, the first and second modulation ramp signals are 180 degrees out of phase with respect to each other.

The first ramp modulation signal 106a and the first input signal 108a (from first summing circuit 78a of feedback circuit 54) are compared by first comparator 86a to provide the first switch drive signal 110a. As shown in FIG. 6, the first switch drive signal 110a is on only when the modulation ramp signal 106a is greater than the input power signal 108a. The second ramp modulation signal 106b and the second input power signal 108b (from second summing circuit 78b of feedback circuit 54) are compared by the second comparator 86b to provide the second switch drive signal 110b. As with the first switch drive signal, the second switch drive signal 110b is on only when the second modulation ramp signal 106b is greater than the second input power signal 108b. Accordingly, the first and second switch drive signals are 180 degrees out of phase with respect to each other.

The switch drive signals can also be conditioned by respective switch drive circuits 88a and 88b which can buffer the switch drive signals and/or provide additional signal strength as may be required by the respective switches 63a and 63b. Each switch blocks electrical power when the respective switch drive signal is off and passes electrical power when the respective switch drive signal is on. By switching parallel power switching circuits 180 degrees out of phase a ripple portion of the electrical power generated by the power source 30 can be reduced.

The reason for the reduction in the ripple can be understood by viewing each power switching circuit as an independent power source. When viewed as an independent power source, the first power switching circuit 42a will produce a ripple portion of the current generated due to switching. When switched at the same frequency and duty cycle, the second power switching circuit 42b will produce the same ripple portion of the current generated due to switching. When the two circuits are switched 180 degrees out of phase, the respective ripple portions of the current generated by each will also by 180 degrees out of phase. Accordingly, when joined in parallel, the ripple portions of each output due to switching will tend to cancel each other thereby reducing the total ripple.

Furthermore, the remaining ripple portion due to switching will have a frequency equal to twice the switching frequency. In particular, each switch 63a and 63b can have a switching frequency of 10 kHz with a 180 degree phase relationship maintained between switching. Accordingly, the combined current output from the power switching circuits 42a and 42b can have a RMS AC ripple portion of the combined output current due to switching which is on the order of less than 5% of the average combined output current, and most preferably on the order of less than 1%. In addition, this AC ripple portion of the combined output current due to switching will have a frequency of 20 kHz.

For example, the first and second switches can each be switched at a 10 kHz frequency with a 180 degree phase relationship between the switching of each switch. The combined output current from the two switching circuits can have an average current of 300 Amps with a 20 kHz ripple portion due to switching. In particular, RMS amplitude of this AC ripple portion can be on the order of less than 0.5% of the average current. This high-frequency, low-amplitude ripple can increase electrode life-time and performance.

Figure 7:
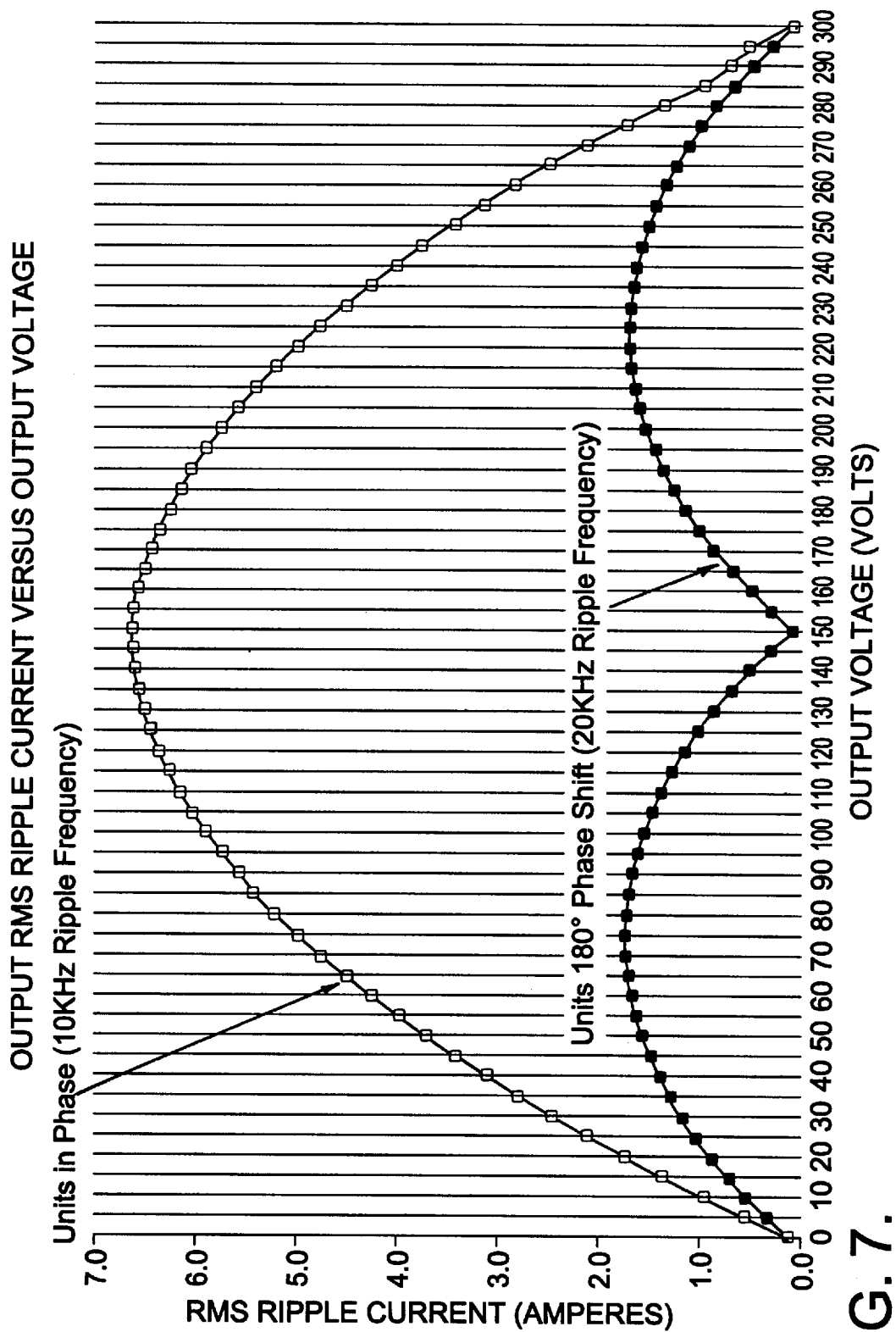
FIG. 7 is a graph illustrating the calculated RMS ripple current as a function of output voltage for power sources according to the present invention.

FIG. 7 illustrates calculated output ripple current for a power source 30 according to the present invention. The calculated output ripple current is plotted as a function of the output voltage. Ripple currents were calculated for a power source 30 including two parallel power switching circuits 42a and 42b, with each power switching circuit including a 650 $\mu$H inductor 68. The unfilled squares represent calculated ripple currents due to switching when the two power switching circuits are switched in phase at 10 kHz resulting in a 10 kHz ripple frequency. The filled squares represent calculated ripple currents due to switching when the two power switching circuits are switched 180° out of phase at 10 kHz, resulting in a 20 kHz ripple frequency.

As shown, the calculated ripple current is substantially lower when the two switching circuits are switched 180° out of phase. In particular, at typical operating voltages from 135 volts to 165 volts, the calculated RMS ripple current due to switching is less than 1 percent of the average output current.

Up to this point, the power source of the present invention has been discussed as having two parallel power switching circuits, both switching at a common duty cycle with a phase relationship of 180 degrees being maintained between switching of the two switching circuits. The power source, however, can include any number of parallel switching sources connected in parallel, with the switching of the power switching circuits being evenly distributed across the switching period.

In particular, if N power switching circuits are connected in parallel, the phase relationship between consecutively switched power switching circuits should be maintained at 360 degrees divided by N. Table 1 lists the preferred phase relationships for various numbers of parallel power switching circuits.

TABLE 1

| No. of Switching Circuits | Phase Relationship |
|---|---|
| 2 | 180 degrees |
| 3 | 120 degrees |
| 4 | 90 degrees |
| * | * |
| * | * |
| * | * |
| N | 360/N degrees |

As before, each power switching circuit switches at a common duty cycle so that each switching circuit handles an equal portion of the load. Accordingly, a greater number of switching circuits reduces the load of any single switching source. Furthermore, the discussed phase relationships reduce the output ripple current.

In the drawings and specification, there have been disclosed typical preferred embodiments of the invention, and, although specific terms are employed, they are used in a generic and descriptive sense only and not for purposes of limitation. The invention has been described in considerable detail with specific reference to a preferred embodiment. It will be apparent, however, that various modifications and changes can be made within the spirit and scope of the invention as described in the foregoing specification and defined in the appended claims.

That which is claimed:

1. A power source for a welding or cutting system, the power source comprising:
   a plurality of electrical power generating means for generating respective electrical output power signals;
   blocking means operably connected to said electrical power generating means for isolating each of said electrical power generating means from the remaining plurality of electrical power generating means;
   combining means for combining said plurality of electrical output power signals into a combined electrical output power signal; and
   control means coupled to said plurality of electrical power generating means for controlling said plurality of electrical power generating means in response to a desired output for the power source so that a ripple portion of said combined power output signal has an RMS ripple component less than 5 percent of an average of said combined output power signal.

2. A power source as defined in claim 1 wherein said combining means comprises means for combining said plurality of electrical output power signals in parallel.

3. A power source as defined in claim 1, wherein each of said electrical power generating means comprises a respective switch for switching electrical power to generate said respective electrical output power signal; and wherein said control means includes a synchronizer positioned in electrical communication with said switches for synchronizing opening and closing of said switches so that said switches switch electrical power at a common duty cycle.

4. A power source as defined in claim 3 wherein said synchronizer maintains a 360/N degree phase relationship between switching of said switches, wherein N is the number of electrical power generating means.

5. A power source as defined in claim 3 wherein each of said plurality of switches comprises at least one insulated gate bipolar transistor.

6. A power source for a welding or cutting system, the power source comprising:
   a plurality of electrical power generating means, wherein each electrical power generating means includes a switch for switching electrical power to generate a respective electrical output power signal;
   combining means for combining the plurality of electrical output power signals into a combined electrical output power signal;
   control means coupled to said plurality of electrical power generating means for controlling said electrical power generating means, wherein said control means includes a synchronizer positioned in electrical communication with said plurality of switches for synchronizing opening and closing of said switches, and wherein said synchronizer comprises:
      a timing signal generator for generating a timing signal having a predetermined frequency;
      a ramp input generator for generating a plurality of ramp input signals responsive to the timing signal of said timing signal generator, the plurality of ramp input signals being 360/N degrees out of phase with respect to each other wherein N is the number of electrical power generating means and the plurality of ramp input signals having a frequency equal to 1/N of the predetermined frequency;
      a plurality of modulation ramp generators for generating a plurality of modulation ramp signals in response to the plurality of ramp input signals, wherein the modulation ramp signals are 360/N degrees out of phase with respect to each other and wherein each of the modulation ramp signals has a frequency equal to 1/N of the predetermined frequency; and
      a plurality of ramp comparators for comparing the modulation ramp signals with the respective input signals for said plurality of respective switches, and for generating a plurality of respective switch drive signals in response thereto, so that said synchronizer maintains a 360/N degree phase relationship between switching of said plurality of switches such that said switches switch electrical power at a common duty cycle and a ripple portion of said combined power output signal has an RMS ripple component less than 5 percent of an average of said combined output power signal at a different phase.

7. A power source as defined in claim 6 wherein said control means further includes a plurality of respective feedback sensors respectively positioned in electrical communication with said switches for sensing respective outputs from each of said respective switches and for providing a plurality of respective feedback signals in response thereto, and a feedback correction circuit comprising:
   a desired signal generator for generating a desired power output signal in response to the desired output;

an output sensor for sensing a combined output of said plurality of switches and for generating an actual output signal in response thereto;

an error comparator for comparing the desired output signal and the actual output signal and generating an error signal in response thereto;

a plurality of summing circuits for summing the error signal with each of said plurality of feedback signals, and for generating respective input signals in response thereto.

8. A power source for a welding or cutting system, the power source comprising:

a plurality of power switching circuits connected in parallel, wherein each power switching circuit includes a respective switch for switching electrical power to a respective output;

blocking means operably connected to said power switching circuits for isolating each one of said power switching circuits from the remaining power switching circuits; and a controller for controlling said plurality of switches in response to a desired output for said power source, said controller including a synchronizer for synchronizing said plurality of switches so that each of said switches switches electrical power at a common duty cycle.

9. A power source as defined in claim 8 wherein said synchronizer maintains a 360/N degree phase relationship between switching of said plurality of switches, wherein N is the number of power switching circuits.

10. A power source as defined in claim 9 wherein said synchronizer comprises:

a timing signal generator for generating a timing signal having a predetermined frequency;

a ramp input generator for generating a plurality of ramp input signals responsive to the timing signal of said timing signal generator, the plurality of ramp input signals being 360/N degrees out of phase with respect to each other and the plurality of ramp input signals having a frequency equal to 1/N of the predetermined frequency;

a plurality of modulation ramp generators for generating a plurality of modulation ramp signals in response to the plurality of ramp input signals, wherein the modulation ramp signals are 360/N degrees out of phase with respect to each other and wherein each of the modulation ramp signals has a frequency equal to 1/N of the predetermined frequency; and a plurality of ramp comparators for comparing the plurality of modulation ramp signals with the respective input power signals for said respective switching circuits, and for generating a plurality of respective switch drive signals in response thereto.

11. A power source as defined in claim 10 wherein said controller further includes a plurality of respective feedback sensors for sensing respective outputs from each of said plurality of respective power switching circuits and for providing a plurality of respective feedback signals in response thereto, and wherein said controller includes a feedback correction circuit comprising:

a signal generator for generating a desired power output signal in response to the desired output;

an output sensor for sensing a combined output of said switches and for generating an actual output signal in response thereto;

an error comparator for comparing the desired output signal and the actual output signal and generating an error signal in response thereto;

a plurality of summing circuits for individually summing the error signal with each respective feedback signal, and for generating respective input signals in response thereto.

12. A power source as defined in claim 8 wherein said controller includes a feedback control circuit comprising:

a signal generator for generating a desired output signal in response to the desired output;

an output sensor for sensing a combined output of said plurality of power switching circuits and for generating an actual output signal in response thereto; and an adjusting circuit for adjusting switching of said plurality of switches in response to a comparison of the desired output signal and the actual output signal.

13. A power source as defined in claim 8 wherein each of said plurality of switches comprises at least one insulated gate bipolar transistor.

14. A power source for a welding or cutting system, the power source comprising:

a plurality of power switching circuits connected in parallel, wherein each power switching circuit includes a respective switch for switching electrical power to a plurality of outputs;

a controller including a synchronizer for synchronizing said switches so that each of said switches switch electrical power at a common duty cycle and further including a feed back control circuit comprising:

a signal generator for generating a desired output signal in response to the desired output;

an output sensor for sensing a combined output of said plurality of power switching circuits and for generating an actual output signal in response thereto;

an adjusting circuit for adjusting switching of said switches in response to a comparison of the desired output signal and the actual output signal; and a plurality of respective feedback sensors for sensing respective outputs from each of said respective power switching circuits and for generating a plurality of respective feedback signals, wherein said adjusting circuit generates an error signal in response to the comparison of the desired and actual output signals, and wherein said adjusting circuit sums the error signal with each of said plurality of feedback signals such that said control means controls said switches in response to a desired output for said power source.

15. A cutting or welding system comprising:

a power source for generating electrical power, said power source comprising;

connection means for connecting said power source to an external power supply;

a plurality of power switching circuits connected in parallel and including a respective switch for switching electrical power from the external power supply to a respective output;

blocking means operably connected to said power switching circuits for isolating each power switching circuit from the remaining power switching circuits; and a controller for controlling said switches in response to a desired output for said power source, said controller including a synchronizer for synchronizing said switches so that each of said switches switch electrical power at a common duty cycle; and an electrode for generating an electric arc between said electrode and the workpiece in response to the electrical power generated by said power source.

16. A system as defined in claim 15, wherein said system further comprises:

positioning means for positioning said electrode relative to the workpiece.

17. A system as defined in claim 15 wherein said synchronizer maintains a 360/N degree phase relationship between switching of said switches, wherein N is the number of power switching circuits.

18. A system as defined in claim 17 wherein said synchronizer comprises:

a timing signal generator for generating a timing signal having a predetermined frequency;

a ramp input generator for generating a plurality of ramp input signals responsive to the timing signal of said timing signal generator, the ramp input signals being 360/N degrees out of phase with respect to each other and the ramp input signals having a frequency equal to 1/N of the predetermined frequency;

a plurality of modulation ramp generators for generating a plurality of modulation ramp signals in response to the plurality of ramp input signals, wherein the modulation ramp signals are 360/N degrees out of phase with respect to each other and wherein each of the modulation ramp signals has a frequency equal to 1/N of the predetermined frequency; and a plurality of ramp comparators for comparing the modulation ramp signals with a plurality of respective input signals for said respective plurality of power switching circuits, and for generating a plurality of respective switch drive signals in response thereto.

19. A system as defined in claim 18 wherein said controller further includes a plurality of respective feedback sensors for sensing respective outputs from each of said respective power switching circuits and for providing a plurality of respective feedback signals in response thereto, and wherein said controller includes a feedback correction circuit comprising:

a desired signal generator for generating a desired output signal in response to the desired output;

an output sensor for sensing a combined output of said plurality of power switching circuits and for generating an actual output signal in response thereto;

an error comparator for comparing the desired output signal and the actual output signal and generating an error signal in response thereto;

a plurality of summing circuits for individually summing the error signal with each respective feedback signal, and for generating respective input signals in response thereto.

20. A system as defined in claim 15 wherein said controller includes a feedback control circuit comprising:

a desired signal generator for generating a desired output signal in response to the desired output;

an output sensor for sensing a combined output of said plurality of power switching circuits and for generating an actual output signal in response thereto; and an adjusting circuit for adjusting switching of said switches in response to a comparison of the desired output signal and the actual output signal.

21. A system as defined in claim 20 wherein said controller further includes a plurality of respective feedback sensors for sensing respective outputs from each of said respective power switching circuits, wherein said adjusting circuit generates an error signal in response to the comparison of the desired and actual output signals, and wherein said adjusting circuit sums the error signal with each of the feedback signals.

22. A system as defined in claim 15 wherein each of said switches comprises an insulated gate bipolar transistor.

23. A method for controlling a power source for a cutting or welding system, the power source comprising a plurality of power switching circuits for switching power to a plurality of respective outputs, the plurality of outputs of the plurality of power switching circuits being connected in parallel, said method comprising the steps of:

switching power at the plurality of power switching circuits in response to a desired output;

isolating each of said power switching circuits from the remaining power switching circuits; and controlling said switching of power so that each of said switching circuits switch electrical power at a common duty cycle.

24. A method as defined in claim 23 further comprising the step of:

synchronizing said switching of power so that a 360/N degree phase relationship is maintained between switching of the plurality of power switching circuits, wherein N is the number of power switching circuits.

25. A method as defined in claim 23 further comprising the steps of:

sensing a combined output of said plurality of power switching circuits;

comparing the desired output and the combined output; and adjusting switching of said plurality of switching circuits in response to said comparison of the desired output and the combined output.

26. A method for controlling a power source for a cutting or welding system, the power source comprising a plurality of power switching circuits for switching power to a respective plurality of outputs, the plurality of outputs of the plurality of power switching circuits being connected in parallel, said method comprising the steps of:

switching power at the plurality of power switching circuits in response to a desired output;

controlling said switching of power so that each switching circuit switches electrical power at a common duty cycle, wherein said controlling step further comprises the step of synchronizing said switching of power, wherein said synchronizing step includes:

generating a timing signal having a predetermined frequency;

generating a plurality of ramp input signals responsive to the timing signal, the ramp input signals being 360/N degrees out of phase with respect to each other and the ramp input signals having a frequency equal to 1/N of the predetermined frequency, wherein N is the number of power switching circuits;

generating a plurality of modulation ramp signals in response to the plurality of ramp input signals, wherein the modulation ramp signals are 360/N degrees out of phase with respect to each other and wherein each of the modulation ramp signals has a frequency equal to 1/N of the predetermined frequency;

comparing the modulation ramp signals with a plurality of respective input signals for the respective power switching circuits; and generating a respective plurality respective switch drive signals in response to said comparison of the modulation ramp signals and the input signals so that said synchronizer maintains a 360/N degree phase relationship between switching of the plurality of power switching circuits such that said switches switch electrical power at a common duty cycle but at a different phase.

27. A method as defined in claim 26 further comprising the steps of:

sensing a plurality of respective outputs from said plurality of power switching circuits;

sensing a combined output of said plurality of power switching circuits;

comparing the desired output and the combined output to determine an error signal; and individually summing the error signal with each of the sensed outputs to determine a respective input signal.

28. A method for controlling a power source for a cutting or welding system, the power source comprising a plurality of power switching circuits for switching power to a plurality of respective outputs, the plurality of outputs of the plurality of power switching circuits being connected in parallel, said method comprising the steps of:

switching power at the plurality of power switching circuits;

generating a desired output signal;

sensing a combined output of said plurality of power switching circuits;

comparing the desired output and the combined output;

generating an error signal in response to said comparison of the desired output and the combined output;

sensing a plurality of outputs from said plurality of power switching circuits;

generating a plurality of respective feedback signals in response to said plurality of sensed outputs; and individually summing the error signal with each of the feedback signals controlling said switching of power so that each of said switching circuits switch electrical power in response to said desired output at a common duty cycle.

29. A method of controlling a power source for increasing performance characteristics of an electrode, the method comprising:

generating a plurality of electrical output signals;

isolating each one of said output signals from the remaining output signals;

combining the plurality of electrical output signals into a combined electrical output signal; and synchronizing the combining of the plurality of output signals in response to a desired output for the power source so that a ripple portion of the combined power output signal has an RMS ripple component less than 5 percent of an average of the combined output power signal.

30. A method as defined in claim 29, wherein the step of synchronizing maintains a 360/N degree phase relationship between the combining of the plurality of electrical output power signals, wherein N is the number of electrical output power signals.

31. A power source for an electric arc tool, the power source comprising:

a plurality of power switching circuits, each of said power switching circuits including a respective switch for switching electrical power to a respective output, the respective outputs of each of said plurality of power switching circuits being connected in parallel;

blocking means operably connected to said electrical power generating means for isolating each electrical power generating means from the remaining electrical power generating means; and a controller for controlling said plurality of power switching circuits in response to a desired power output for said power source, said controller including a synchronizer for synchronizing said plurality of switching circuits so that each of said switches switch electrical power at a common duty cycle.

32. A power source for an electric arc tool as defined in claim 31:

wherein said plurality of power switching circuits comprises a predetermined number of power switching circuits including a first and a second power switching circuit; and wherein said synchronizer maintains a phase relationship between switching of said first and second power switching circuits, said phase relationship being equal to about 360 degrees divided by said predetermined number.

33. A power source for an electric arc tool as defined in claim 32 wherein said synchronizer evenly distributes switching of said power switching circuits across a switching period, so that said phase relationship is maintained between consecutively switched switching circuits.

34. A power source for an electric arc tool as defined in claim 31 wherein each of said switches comprises at least one insulated gate bipolar transistor.

* * * * *

UNITED STATES PATENT AND TRADEMARK OFFICE
CERTIFICATE OF CORRECTION

PATENT NO. : 5,811,757
DATED : September 22, 1998
INVENTOR(S) : Higgins

It is certified that error appears in the above-identified patent and that said Letters Patent is hereby corrected as shown below:

On the title page, item [56]:

In the References Cited, OTHER PUBLICATIONS, line 33, "F-14-014-B" should read --F-15-014-B--; line 40, "IM-41 H H-401" should read --IM-41 H-401--; line 44, after "Jul.," insert --1993,--.

Column 12, line 64, after "plurality" insert --of--.

Column 13, line 33, omit "and"; line 35, after "signals" insert --;and--.

Signed and Sealed this

Twenty-sixth Day of January, 1999

Attest:

Attesting Officer

Acting Commissioner of Patents and Trademarks